US011287545B2

(12) United States Patent
Gulliver et al.

(10) Patent No.: US 11,287,545 B2
(45) Date of Patent: Mar. 29, 2022

(54) MAGNETIC FREEPOINT INDICATOR TOOL

(71) Applicant: Baker Hughes Oilfield Operations LLC, Houston, TX (US)

(72) Inventors: Jim Andrew Gulliver, Farnborough (GB); Andrew Smith, Houston, TX (US); James David Ratcliffe, Farnborough (GB); Sushant Dutta, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 143 days.

(21) Appl. No.: 16/727,394

(22) Filed: Dec. 26, 2019

(65) Prior Publication Data

US 2021/0199837 A1    Jul. 1, 2021

(51) Int. Cl.
*G01V 3/26* (2006.01)
*E21B 47/092* (2012.01)

(52) U.S. Cl.
CPC .............. *G01V 3/26* (2013.01); *E21B 47/092* (2020.05)

(58) Field of Classification Search
CPC ......... E21B 47/092; E21B 17/06; E21B 47/09
See application file for complete search history.

(56) References Cited

U.S. PATENT DOCUMENTS

| 2,804,287 | A |   | 8/1957  | Huet |
| 2,814,019 | A |   | 11/1957 | Bender |
| 2,902,640 | A |   | 9/1959  | Foster |
| 3,011,340 | A |   | 12/1961 | Dahle |
| 3,636,347 | A |   | 1/1972  | Soulant, Jr. |
| 4,279,163 | A |   | 7/1981  | Takekoshi |
| 4,408,160 | A |   | 10/1983 | King |
| 4,440,019 | A |   | 4/1984  | Marshall |
| 4,708,204 | A |   | 11/1987 | Stroud |
| 4,766,764 | A | * | 8/1988  | Trevillion ............. E21B 47/092 73/152.56 |
| 4,833,926 | A |   | 5/1989  | Todoroki |
| 5,258,755 | A | * | 11/1993 | Kuckes ............... E21B 47/0228 340/853.5 |
| 7,038,444 | B2|   | 5/2006  | Crouch |

(Continued)

FOREIGN PATENT DOCUMENTS

| WO | 2007/122357 | 11/2007 |
| WO | 2008/030620 | 3/2008  |
| WO | 2009/003236 | 1/2009  |

OTHER PUBLICATIONS

"SQUID" Wikipedia, https://en.wikipedia.org/wiki/SQUID, accessed Dec. 26, 2019.

*Primary Examiner* — Alvaro E Fortich
(74) *Attorney, Agent, or Firm* — Hogan Lovells US LLP

(57) ABSTRACT

A system for determining a stuck point of a pipe positioned within a wellbore includes a tubular housing and a sensor array positioned within the tubular housing, the sensor array arranged at a first end. The system also includes a first magnetic source positioned within the tubular housing, the first magnetic source arranged at a second end. The system further includes a second magnetic source positioned within the tubular housing, the second magnetic source arranged between the sensor array and the second end. The first magnetic source and the second magnetic source have a different magnetic field source.

17 Claims, 10 Drawing Sheets
(5 of 10 Drawing Sheet(s) Filed in Color)

(56) References Cited

U.S. PATENT DOCUMENTS

| | | |
|---|---|---|
| 7,389,183 B2 | 6/2008 | Gray |
| 7,526,964 B2 | 5/2009 | Goldfine |
| 7,591,307 B2 | 9/2009 | Gibson |
| 7,660,197 B2 | 2/2010 | Barolak |
| 7,990,138 B2 | 8/2011 | Martin |
| 8,035,374 B1 | 10/2011 | Girrell |
| 8,076,940 B2 | 12/2011 | Martin |
| 8,079,414 B2 | 12/2011 | Smaardyk |
| 8,207,730 B2 | 6/2012 | Martin |
| 8,284,074 B2 | 10/2012 | Orban |
| 8,471,556 B2 | 6/2013 | Martin |
| 8,797,033 B1 | 8/2014 | Girrell |
| 9,255,851 B2 | 2/2016 | Mason |
| 2006/0117759 A1* | 6/2006 | Hall ............... E21B 41/0085 62/3.2 |
| 2006/0221768 A1* | 10/2006 | Hall ..................... G01V 1/40 367/82 |
| 2007/0206555 A1* | 9/2007 | Kruspe ............... G01R 33/421 370/338 |
| 2009/0003130 A1 | 1/2009 | Barolak |
| 2009/0166035 A1* | 7/2009 | Almaguer ............ E21B 43/11 166/254.1 |
| 2010/0181994 A1 | 7/2010 | Martin |
| 2010/0257927 A1 | 10/2010 | Smaardyk |
| 2012/0194195 A1* | 8/2012 | Wisler ................. E21B 47/13 324/346 |
| 2014/0002071 A1 | 1/2014 | Martin |

\* cited by examiner

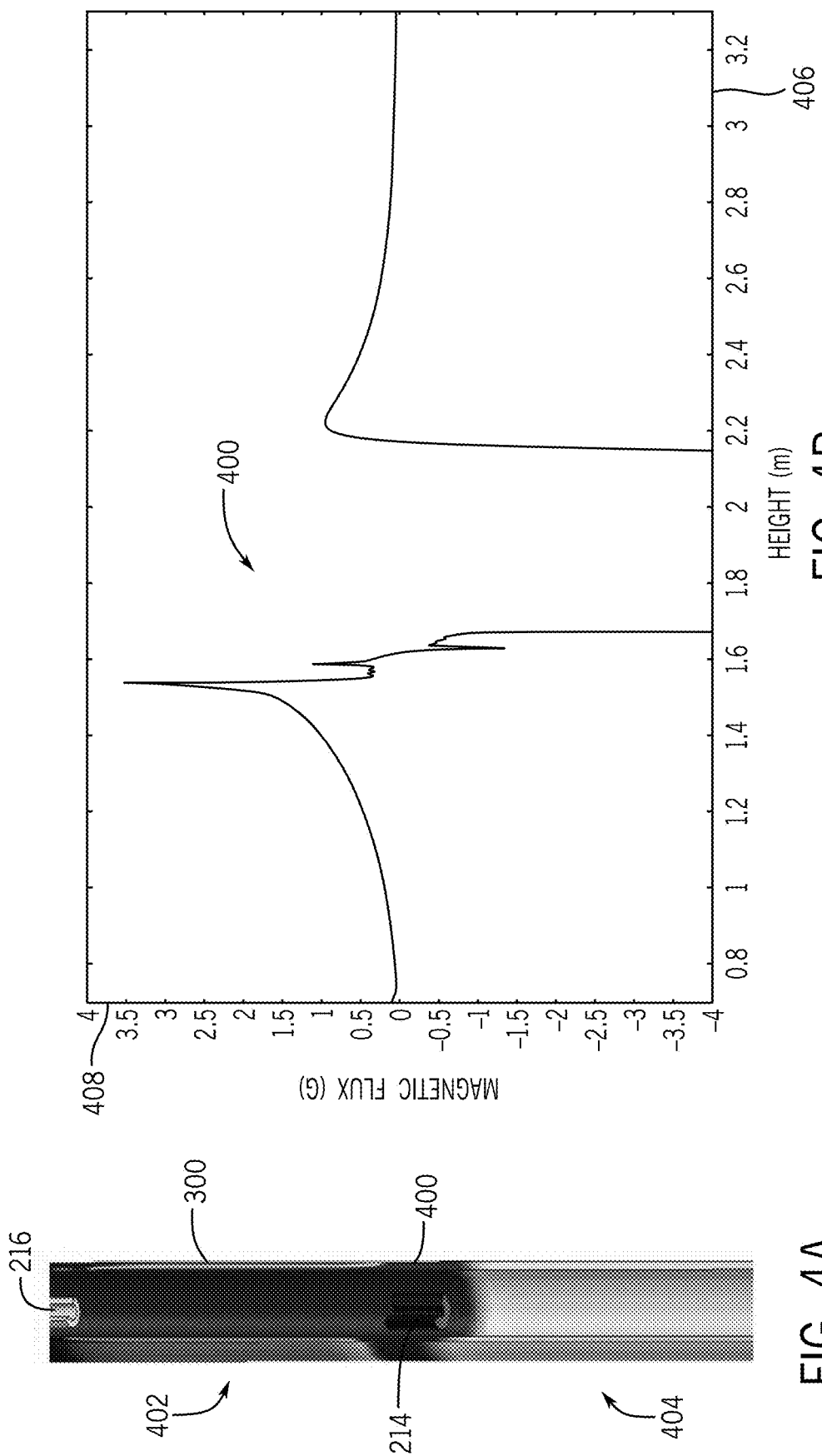

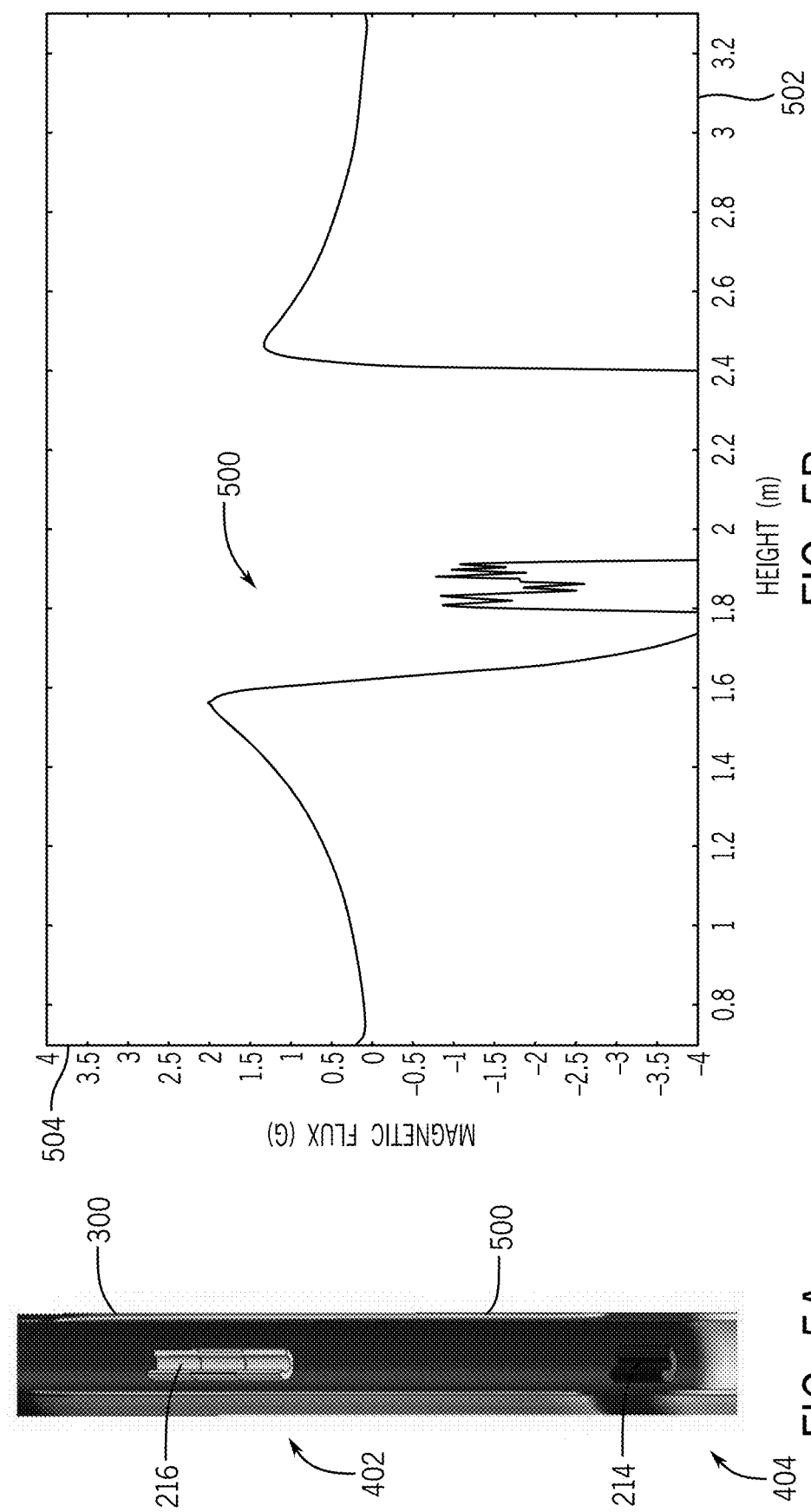

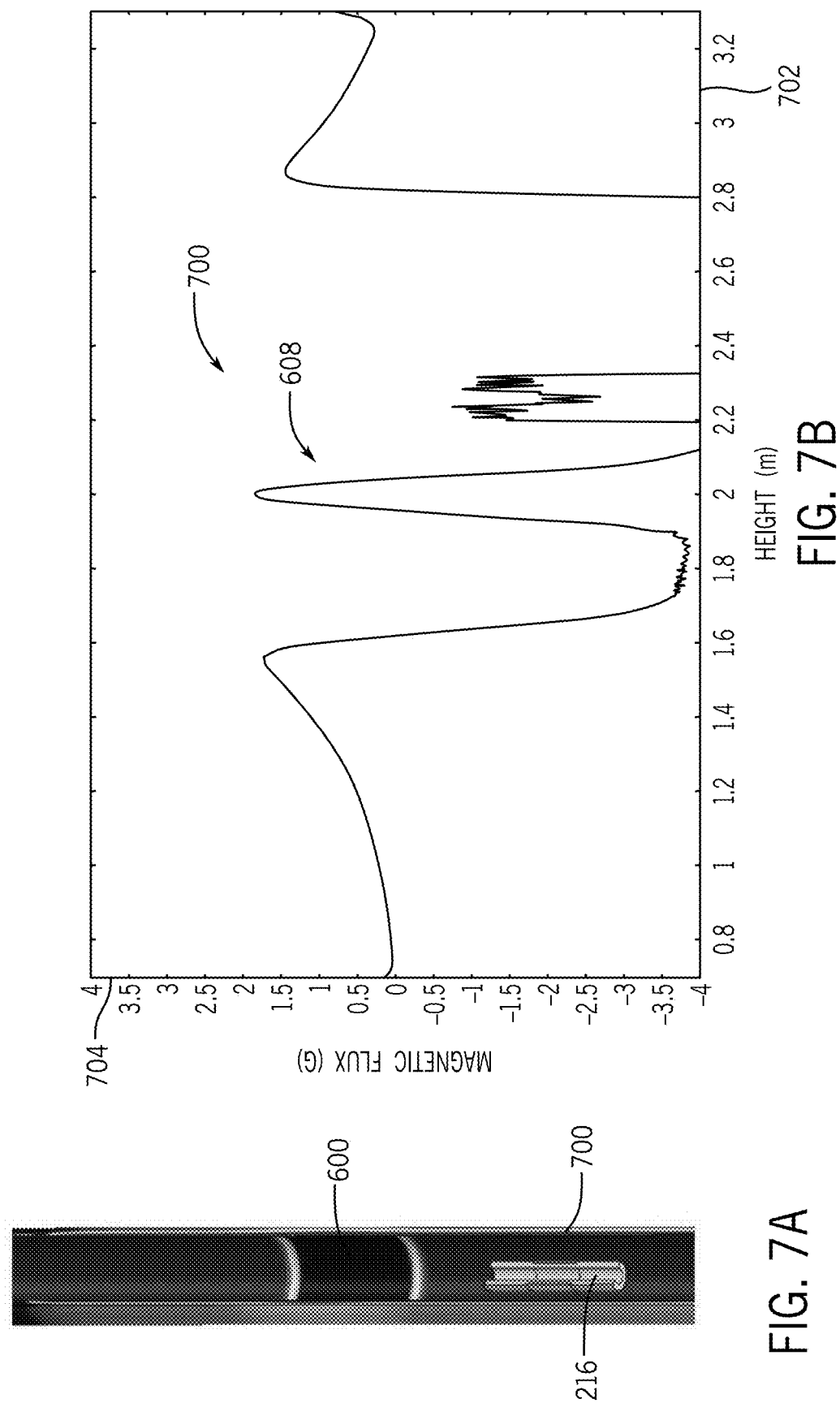

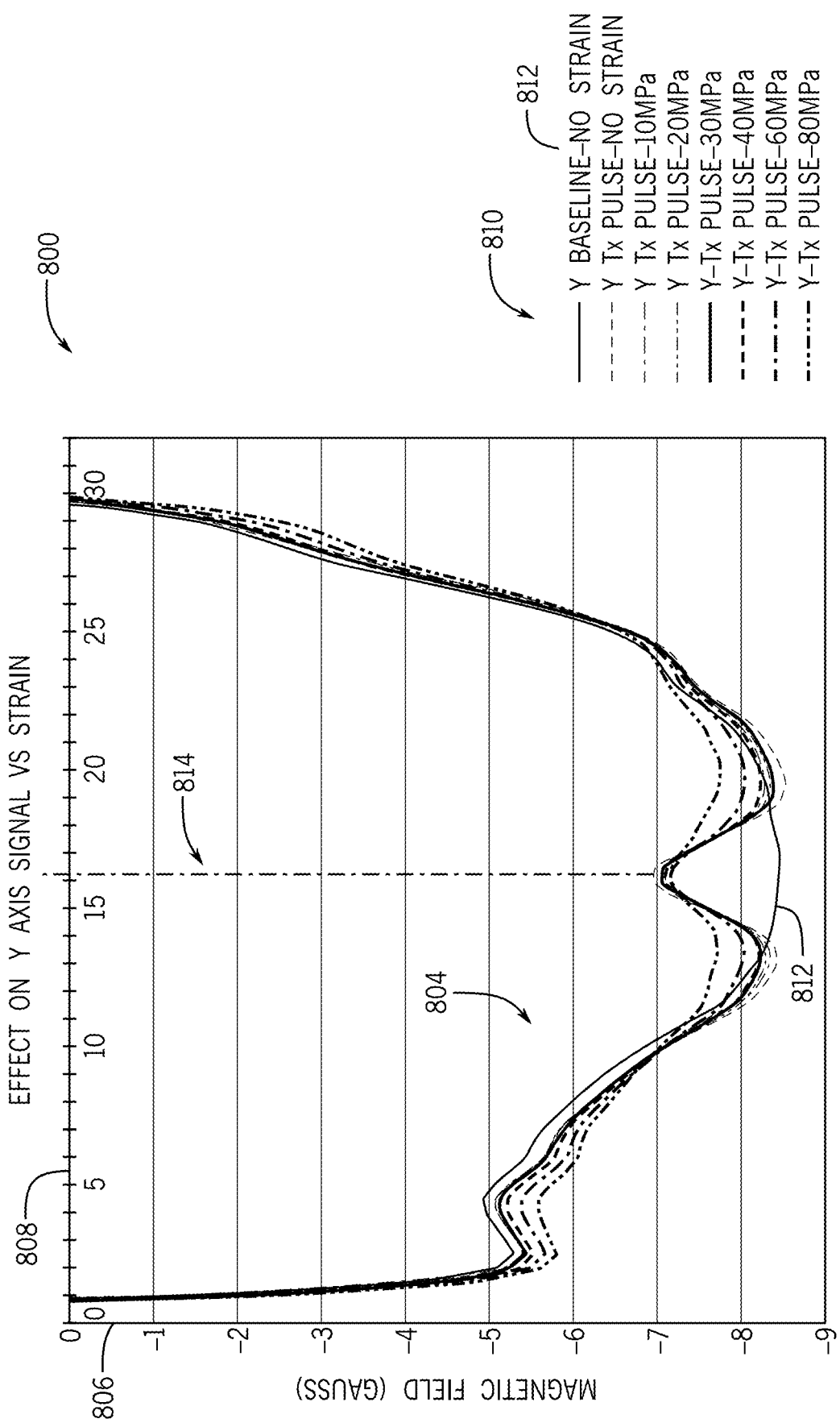

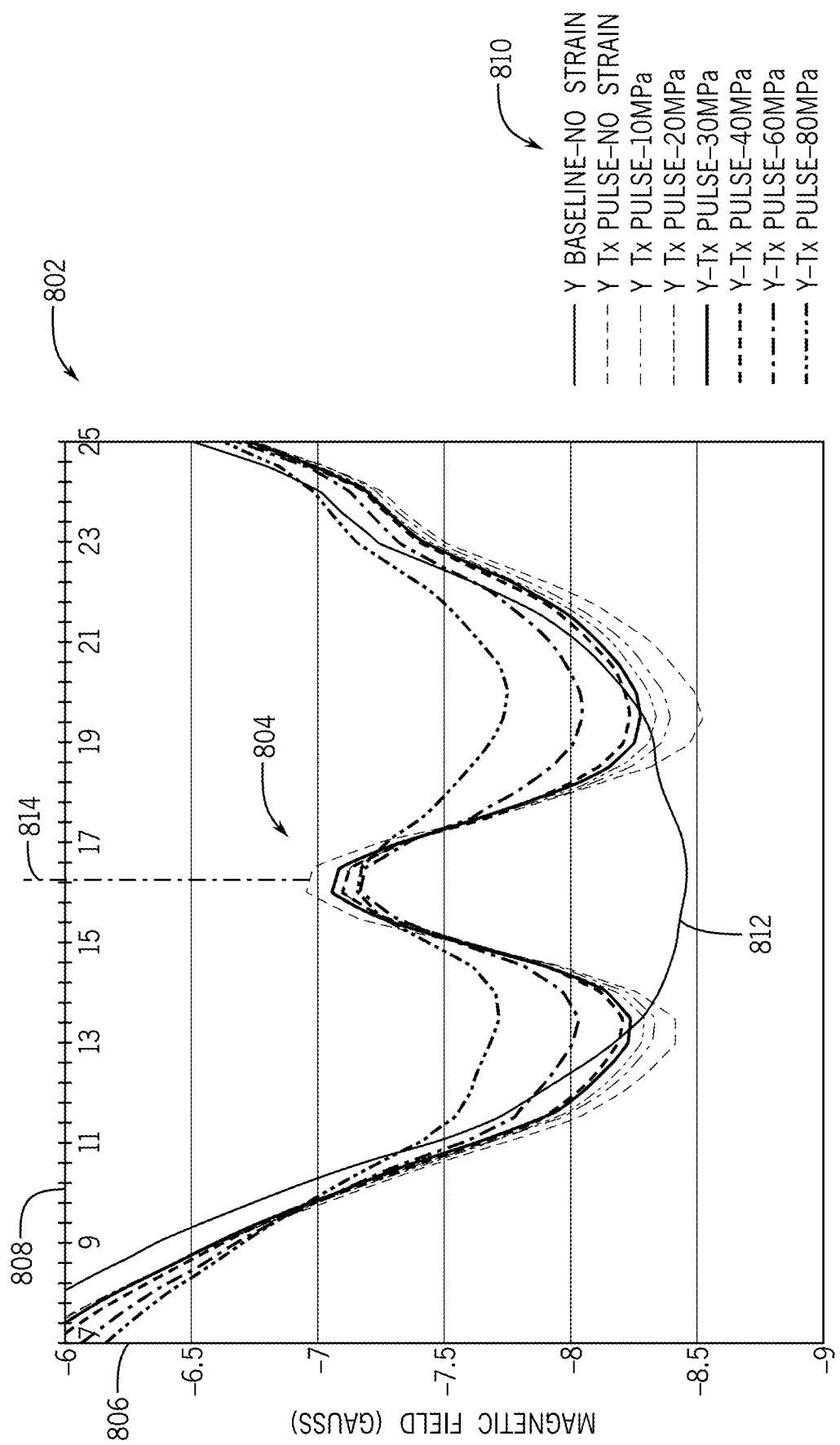

MAGNETIC FREEPOINT INDICATOR TOOL

BACKGROUND OF THE DISCLOSURE

1. Field of the Disclosure

The present disclosure relates in general to downhole tools and more particularly to downhole tools utilized to assist with drilling operations.

2. Brief Description of Related Art

During downhole drilling and recovery operations, portions of a drill string may become stuck. For example, while wells are being drilled undesirable events, such as hole collapse, differential stick, key seating, and the like may cause the drill string to become stuck within the formation. This situation is undesirable and may hinder drilling operations. In addition, drill pipe may represent a significant investment, and as a result, recovering at least a portion of the drill pipe may be desirable. However, it is difficult to determine where the sticking point has occurred. As a result, operators either conduct several runs to determine the sticking point, which is not cost effective, or leave large portions of the pipe in the formation.

SUMMARY OF THE DISCLOSURE

Applicants recognized the problems noted above herein and conceived and developed embodiments of systems and methods, according to the present disclosure, for downhole identification pipe sticking points.

In an embodiment, a system for determining a stuck point of a pipe positioned within a wellbore includes a tubular housing and a sensor array positioned within the tubular housing, the sensor array arranged at a first end of the tubular housing. The system also includes a first magnetic source positioned within the tubular housing, the first magnetic source arranged at a second end of the tubular housing. The system further includes a second magnetic source positioned within the tubular housing, the second magnetic source arranged between the sensor array and the second end. The first magnetic source and the second magnetic source have a different magnetic field source.

In another embodiment, a system includes one or more sections of pipe in a wellbore formed in a downhole formation. The system also includes a stuck section of pipe, of the one or more sections of pipe, the stuck section of pipe being positioned in the wellbore and having a free end, a stuck end, and a stuck point between the free end and the stuck end. The system further includes a magnetic freepoint indicator tool (MFIT). The MFIT includes a sensor array, arranged at a first end of the MFIT, the sensor array measuring magnetic flux data. The MFIT also includes a first magnetic source, arranged at a second end of the MFIT, the first magnetic source configured to write a first magnetic signature along the one or more sections of pipe. The MFIT further includes a second magnetic source, the second magnetic source configured to write a second magnetic signature along the one or more sections of pipe. The sensor array measures a first magnetic flux and a second magnetic flux, the first magnetic flux including the first magnetic signature and the second magnetic signature, a comparison between the first magnetic flux and the second magnetic flux identifying the stuck point.

In an embodiment, a method for identifying a stuck point of a pipe arranged in a wellbore includes writing a first magnetic profile along at least a portion of the pipe. The method also includes writing a second magnetic profile along at least the portion of the pipe, wherein at least a portion of the first magnetic profile overlaps at least a portion of the second magnetic profile. The method further includes acquiring a first magnetic flux over at least the portion of the pipe. The method also includes acquiring a second magnetic flux over at least the portion of the pipe. The method includes determining that a difference between the first magnetic flux and the second magnetic flux at an overlapping location exceeds a threshold.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present technology will be better understood on reading the following detailed description of non-limiting embodiments thereof, and on examining the accompanying drawings, in which:

FIG. 4A is a schematic cross-sectional view of a magnetic flux within a pipe, in accordance with embodiments of the present disclosure;

FIG. 4B is a graphical representation of a magnetic flux within a pipe, in accordance with embodiments of the present disclosure;

FIG. 5A is a schematic cross-sectional view of a magnetic flux within a pipe, in accordance with embodiments of the present disclosure;

FIG. 5B is a graphical representation of a magnetic flux within a pipe, in accordance with embodiments of the present disclosure;

FIG. 7A is a schematic cross-sectional view of a magnetic flux within a pipe, in accordance with embodiments of the present disclosure;

FIG. 7B is a graphical representation of a magnetic flux within a pipe, in accordance with embodiments of the present disclosure;

FIGS. 8A and 8B are graphical representations of a magnetic flux comparison, in accordance with embodiments of the present disclosure.

DETAILED DESCRIPTION

Figure 1:
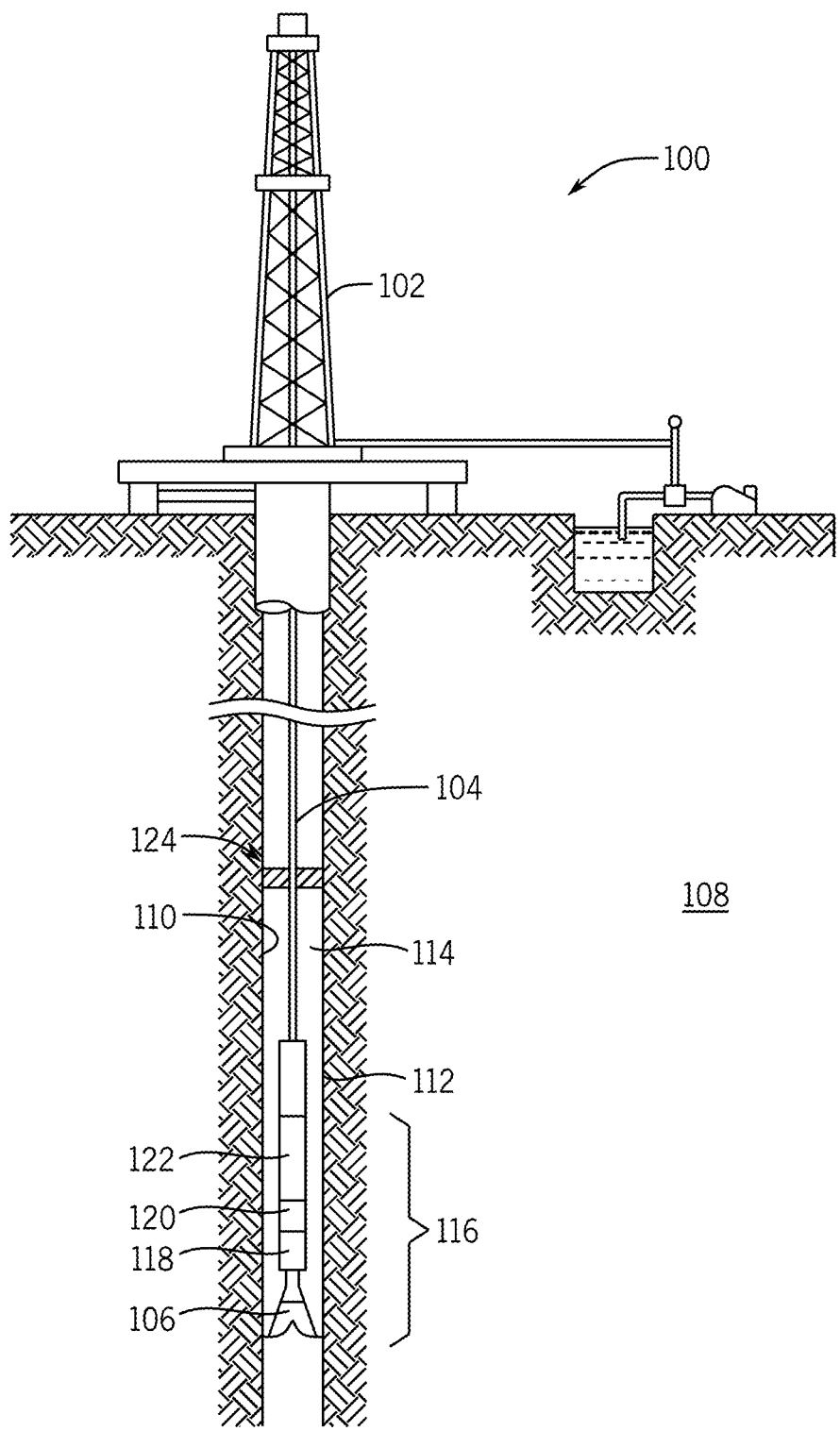
FIG. 1 is a schematic side view of an embodiment of a drilling system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations. Furthermore, like reference numbers may be used between figures to illustrate like components, but it should be appreciated that embodiments are not limited to utilizing like components.

Embodiments of the present disclosure include a magnetic freepoint indicator tool (MFIT) that may be tripped into and out of a wellbore to identify a stuck point of a pipe positioned within the wellbore. In various embodiments, the MFIT includes one or more magnetizing elements, such as a permanent magnet and/or a pulsed coil, to write a magnetic flux onto the pipe (e.g., magnetize the pipe). Thereafter, a sensor may evaluate the magnetic flux of the pipe at a given location. The MFIT may then evaluate a change in magnetic flux, to a portion of the pipe, after a force is applied to the pipe. By the process of magnetorestriction, a force applied to a free portion of the pipe may have a changed magnetic flux, as compared to a fixed or stuck portion of the pipe. As a result, a comparison between the magnetic flux of the pipe before and after the force application may enable identification of the stuck point.

FIG. 1 is a schematic side view of an embodiment of a downhole drilling system 100 (e.g., drilling system) that includes a rig 102 and a drill string 104 coupled to the rig 102. The drill string 104 includes a drill bit 106 at a distal end that may be rotated to engage a formation 108 and form a wellbore 110. In various embodiments, the drill string 104 is formed from one or more tubulars that are mechanically coupled together (e.g., via threads, specialty couplings, or the like). As shown, the wellbore 110 includes a borehole sidewall 112 (e.g., sidewall) and an annulus 114 between the wellbore 110 and the drill string 104. Moreover, a bottom hole assembly (BHA) 116 is positioned at the bottom of the wellbore 110. The BHA 116 may include a drill collar 118, stabilizers 120, or the like. It should be appreciated that the BHA 116 is provided for illustrative purposes only and that various other components may be coupled to the drill string 104.

In operation, drilling mud or drilling fluid is pumped through the drill string 104 and out of the drill bit 106. The drilling mud flows into the annulus 114 and removes cuttings from the face of the drill bit 106. Moreover, the drilling mud may cool the drill bit 106 during drilling operations and further provide pressure stabilization in the wellbore 110. In the illustrated embodiment, the drilling system 100 includes various tools 122, such as logging tools, which may be utilized to obtain measurements from the formation 108. These tools may be referred to as "logging while drilling" tools and may include nuclear tools, acoustic tools, seismic tools, magnetic tools, electrical tools, and the like. Furthermore, while the illustrated embodiment includes the drill string 104, it should be appreciated that various embodiments of the present disclosure may be incorporated into a wireline system, a coiled tubing system, or any other downhole investigation system.

FIG. 1 further illustrates a stuck point location 124. The stuck point location 124 is a location where the drill string 104 and/or any other pipe utilized in the system (e.g., production piping, casing, etc.) is stuck. Stuck refers to piping that cannot be withdrawn from the wellbore 110 to the surface without intervention or significant forces. In other words, stuck piping may not be able to be tripped in/out of the wellbore without intervention, such as applying additional force, which may be undesirable. Embodiments of the present disclosure may utilize a tool, such as a magnetic freepoint indicator tool (MFIT) to locate the stuck point location 124, based at least in part on an evaluation of magnetic permeability in the pipe. For example, the MFIT may be utilized to determine a stuck point within the wellbore, where one or more components, such as drill pipe, has become lodged within the wellbore. In embodiments, the MFIT combines the use of both permanent magnets and a pulsed coil to pre-condition the drill pipe and to maximize residual pulse amplitude, which may be marked on the inner diameter of the pipe. As a result, the MFIT may include one or more magnetic sources and one or more sensors to measure the residual pulse amplitude, among other measurements. Furthermore, additional components may also be utilized in combination with the MFIT. For example, in operation, an uphole component such as a table or top drive may be utilized in order to apply a force to the drill pipe (e.g., a linear force, a rotational force, etc.). Thereafter, magnetic permeability of a pipe region that experiences strain (the free end) may be measured, while regions that do not experience strain (e.g., regions below the stuck point) will not have a change in magnetic permeability. As a result, a measurement of a remnant magnetic field, after magnetization of the pipe, may be utilized to determine the stuck point. In this manner, the stuck region may be identified and pipe upstream may be removed (e.g., unthreaded, cut, etc.) from the wellbore to enable operations to continue while saving the pipe.

Traditional systems may include a tool consisting of a load cell and two anchors or clamps, which are run into the pipe and anchored into place. Then the pipe is pulled or twisted. If the load cell measures a change in strain, the tool is located above the stuck point. If it measures no change to strain, it is located below the stuck point. By continuing this process along the length of pipe, the stuck point may eventually be found. However, this process is slow, which can be costly for producers. A variety of other tools may be utilized, each having various drawbacks. For example, pipe stretching evaluations are often inaccurate. Additionally, anchor tools are slow and do not lend themselves to a continuous logging process. Sonic tools typically have signal/noise problems. Permeability measurements often have difficulties due to currents and low amplitudes.

Accordingly, embodiments of the present disclosure are directed toward a magnetic tool that determines the stuck point location 126 utilizing a combination of magnetic sources. For example, a permanent magnet and a pulsed coil (e.g., electromagnet). The permanent magnetic may be aligned to generate a field in the opposite direction of the coil, thereby improving the relative magnitude of the pulse, by first laying a DC offset of the opposite sign. For example, the permanent magnetic may be negative, following by a positive pulse. As a result, the peak magnitude of the pulse is similar to that achieved without the permanent magnet, but, including the negative DC offset created by the permanent magnetic, the relative pulse height is significantly larger. However, it should be appreciated that the permanent magnetic and the coil may be aligned to generate fields in the same direction. For example, if both were aligned to positive, the absolute pulse magnitude would be improved by adding a positive DC offset to the pulsed signal, shifting the overall pulse in the positive direction. Additionally, in embodiments, the permanent magnetic may be aligned perpendicular to the axis of the coil. As a result, a circumferential or hoop field is generated in the pipe wall, perpendicular to the field generated by the coil. This may be useful in situations where hoop fields change more than axial fields, such as in torqueing scenarios. It should be appreciated that any combination of orientations between the permanent magnet and the pulsed coil may be utilized (e.g., both positive, both negative, one positive and one negative).

Embodiments of the present disclosure may enable a larger amplitude pulse than would be available using only a permanent magnet or only a pulsed coil. By combining this improved amplitude with sensor arrays, the sensitivity of the tool changes with respect to the permeability of the pipe to improve detection of the free point and also allows for better determination of the percentage stuck value.

In various embodiments, the MFIT is deployed when pipe is stuck, for example during a drilling operation. In various embodiments, as noted above, the MFIT includes a permanent magnetic and a pulsed coil, such as an electromagnet. On the down pass (e.g., tripping into the wellbore), the MFIT magnetises the drill pipe. Sensors located above the magnet measure and/or log the baseline remote field from the flux generated in the pipe. Next, the pipe is overpulled and/or torqued. For example, the drilling rig may be used to apply a torsional or axial force to the pipe. The remote field from the remaining flux is logged again on the up pass (e.g., tripping out of the wellbore). As will be appreciated, the sensors may lead the magnet on the up pass. Comparisons of the logs show where stress has erased (e.g., reduced) the flux due to magnetostrictive effect.

Figure 2:
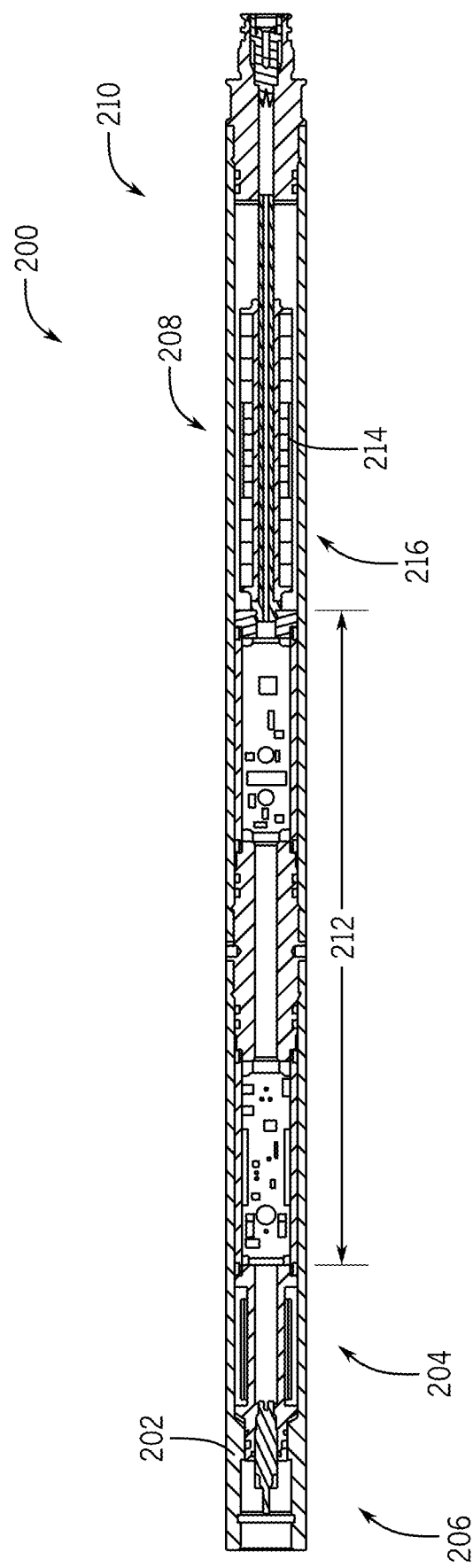
FIG. 2 is a schematic cross-sectional view of an embodiment of a magnetic freepoint indicator tool (MFIT), in accordance with embodiments of the present disclosure.

FIG. 2 is a schematic cross-sectional view of an embodiment of a MFIT 200. It should be appreciated that various components of the MFIT 200 have been eliminated for clarity. The illustrated embodiment includes a housing 202, which may be a tubular designed to withstand expected wellbore pressures and temperatures. The housing 202 includes various electronics, which may include processors, memories, and communication modules to facilitate receipt and/or transmission of instructions and/or data. For example, instructions may be received from a surface location, such as to begin pulsing the coil. Additionally, in embodiments, collected data may be transmitted to a surface location. However, it should be appreciated that instructions and data may both be stored at onboard memory or memory that is coupled to the device for recording purposes.

Further illustrated is a sensor array 204 at a first end 206 of the MFIT 200, which may be an uphole end of the tool. The sensor array 204 may further include associated electronics. In various embodiments, the sensor array 204 includes a plurality of sensors. In one embodiment, the sensor array 204 includes 8, 3-axis chips arranged circumferentially about the housing 202, thereby creating 24 total axes. By way of example only, the sensor array 204 may include anisotropic magneto-resistive (AMR) sensors. However, it should be appreciated that a variety of different magnetometers may be used with embodiments of the present disclosure, such as Hall effect sensors, magneto-diodes, magneto-transistors, GMR magnetometers, superconducting quantum interference devices (SQUIDs), flux-gates, sensing coils, or a combination thereof. Additionally, a transmitter 208 is arranged at a second end 210 of the MFIT 200, which may be a downhole end of the tool. In other words, the second end 210 is inserted into the wellbore first. As noted above, the initial run includes applying a baseline magnetic field and recording that field via the sensor array 204. Then, as the tool is removed from the wellbore, the sensor array 204 measures changes in the magnetic retentivity. In the illustrated embodiment, the sensor array 204 is offset from the transmitter 208 by an offset distance 212, which may be particularly selected based on a strength of the transmitter, a length of the tool, or the like. As will be appreciated, if the sensor array 204 is too close to the transmitter 208, then the sensor array 204 may pick up magnetic data from the transmitter 208 and not the pipe.

In various embodiments, the transmitter 208 includes both a permanent magnet 214 and a pulsed coil 216, such as an electromagnet. It should be appreciated that the permanent magnet 214 and the pulsed coil 216 may be separated and arranged at different locations within the housing 202 and/or on different tools. However, the illustrated embodiment includes the integrated transmitter 208, which provides the benefit of saving overall tool length.

Figure 3:
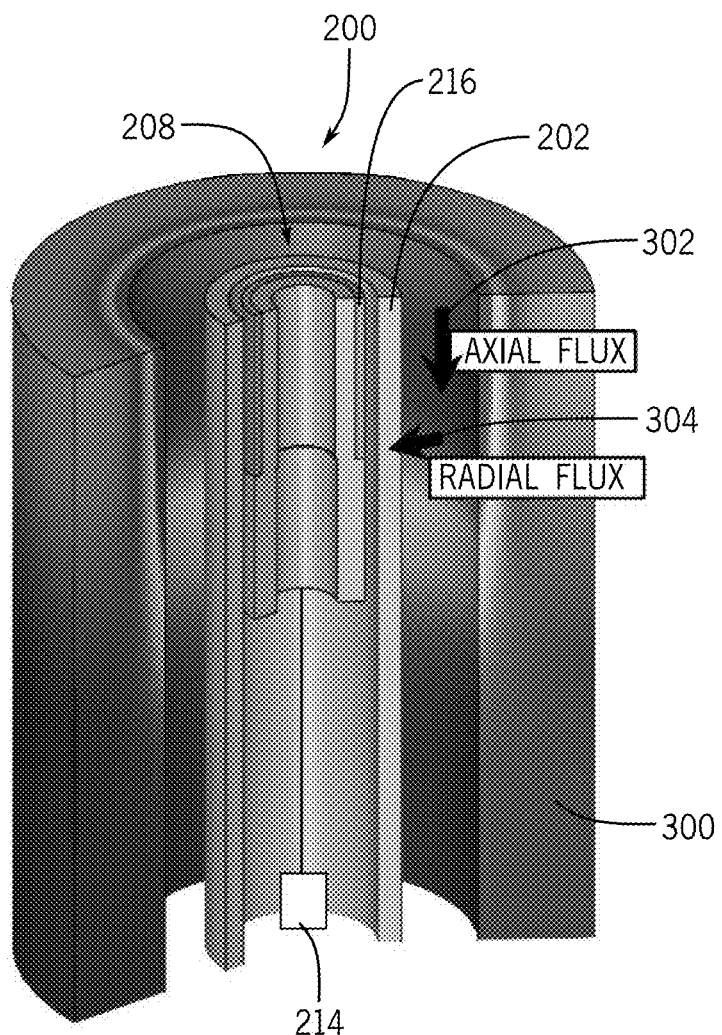
FIG. 3 is a schematic cross-sectional view of a magnetic flux within a pipe, in accordance with embodiments of the present disclosure.

FIG. 3 is a schematic cross sectional view of an embodiment of the MFIT 200 arranged within a pipe 300. For example, the pipe 300 may be drill pipe that becomes stuck or otherwise immobile in the wellbore. The illustrated MFIT 200 includes the housing 202 having the transmitter 208. It should be appreciated that the illustrated MFIT 200 does not include each feature described in FIG. 2 for clarity. In FIG. 3, the MFIT 200 is being tripped into the wellbore (e.g., lowered into the wellbore) in order to magnetize the pipe 300. In various embodiments, the transmitter 208 includes both the permanent magnet 214 and the pulsed coil 216, which is illustrated as a coil wrapped around a core. However, as noted, the two magnets may be separated, as shown in FIG. 3. As the transmitter 208 extends into the wellbore, the pulsed coil 216 is activated, which may produce "bands" of magnetized material in the drill pipe 300. In various embodiments, these bands are produced approximately every 1 or 2 feet, and as a result, the tool may write hundreds or thousands of pulses within the wellbore. As illustrated, there is both an axial flux 302 (represented by the arrow) and a radial flux 304 (represented by the arrow). As a result, a patterned flux may be applied to the pipe 300, which may be detected by the sensor array.

The pulsed magnetizing field may generate a flux connected in thin skin, close to the bore of the pipe 300. The permanent magnet, which may produce a higher field and more flux, may penetrate through the well of the pipe 300. Additionally, the permanent magnet writes (e.g., applies, emits) a continuous pattern. Moreover, the flux is more dilute, particularly with thick-walled collars. As a result, the flux density when using the pulsed magnet may be much higher than from the permanent magnet. By combing both the pulsed coil and the permanent magnet into the MFIT 200, the benefits of each system may be achieved, thereby providing improved measurements. For example, non-uniform flux patterns, with radial orientations, may be useful for providing additional contrast and/or sensitivity.

FIG. 4A is an isometric cross-sectional view of an embodiment of the permanent magnet 214 arranged within a pipe 300 and FIG. 4B is a graphical representation of a magnetic flux within the pipe 300. As described above, in various embodiments the permanent magnet 214 may be arranged separately from the pulsed coil 216, as illustrated in FIG. 4A. However, it should be appreciated that the permanent magnet 214 and pulsed coil 216 may be integrated into a single unit. In operation, the MFIT 200 is tripped downhole and as the permanent magnet 214 travels along the pipe 300, it writes a continuous magnetic flux 400 into the pipe 300. In the illustrated embodiment, a top region 402 of the pipe 300 has the flux 400 while the bottom region 404 does not. It should be appreciated that the top region 402 refers to an area above the permanent magnet 214 and the bottom region 404 refers to an area below the permanent magnet 214. As the permanent magnet 214 is tripped into the pipe 300, the bottom region 404 will become smaller, as illustrated herein.

FIG. 4B represents the magnetic flux 400 present within the pipe 300, with the x-axis 406 indicating an axial position of the pipe, and the y-axis 408 indicating a magnetic flux value. As the permanent magnet 214 moves through the pipe 300, the magnetic flux may receive a value due to the interaction with the permanent magnet 214.

FIG. 5A is an isometric cross-sectional view of an embodiment of the permanent magnet 214 arranged within a pipe 300 and FIG. 5B is a graphical representation of a magnetic flux within the pipe 300. However, in the illustrated embodiment, both the permanent magnet 214 and the pulsed coil 216 have moved in a downward direction, axially along the pipe 300, such that the bottom region 404 is now smaller than that illustrated in FIG. 4A. The pulsed coil 216 is now arranged proximate the previous location of the permanent magnet 214. As noted above, the pulsed coil 216 may emit pulses at a variety of different times to increase the magnetic flux in the pipe 300. In various embodiments, the pulsed coil 216 may have an opposite polarity, thereby facilitating a larger pulse detection, as described above.

FIG. 5B represents the magnetic flux 500 present within the pipe 300, with the x-axis 502 indicating an axial position of the pipe, and the y-axis 504 indicating a magnetic flux value. As the permanent magnet 214 moves through the pipe 300, the magnetic flux may receive a value due to the interaction with the permanent magnet 214 and/or the pulsed coil 216. When comparing the graphical representations of FIGS. 4B and 5B, it is evident that the permanent coil continues to write to the pipe downhole of the previous location.

Figures 6A, 6B:
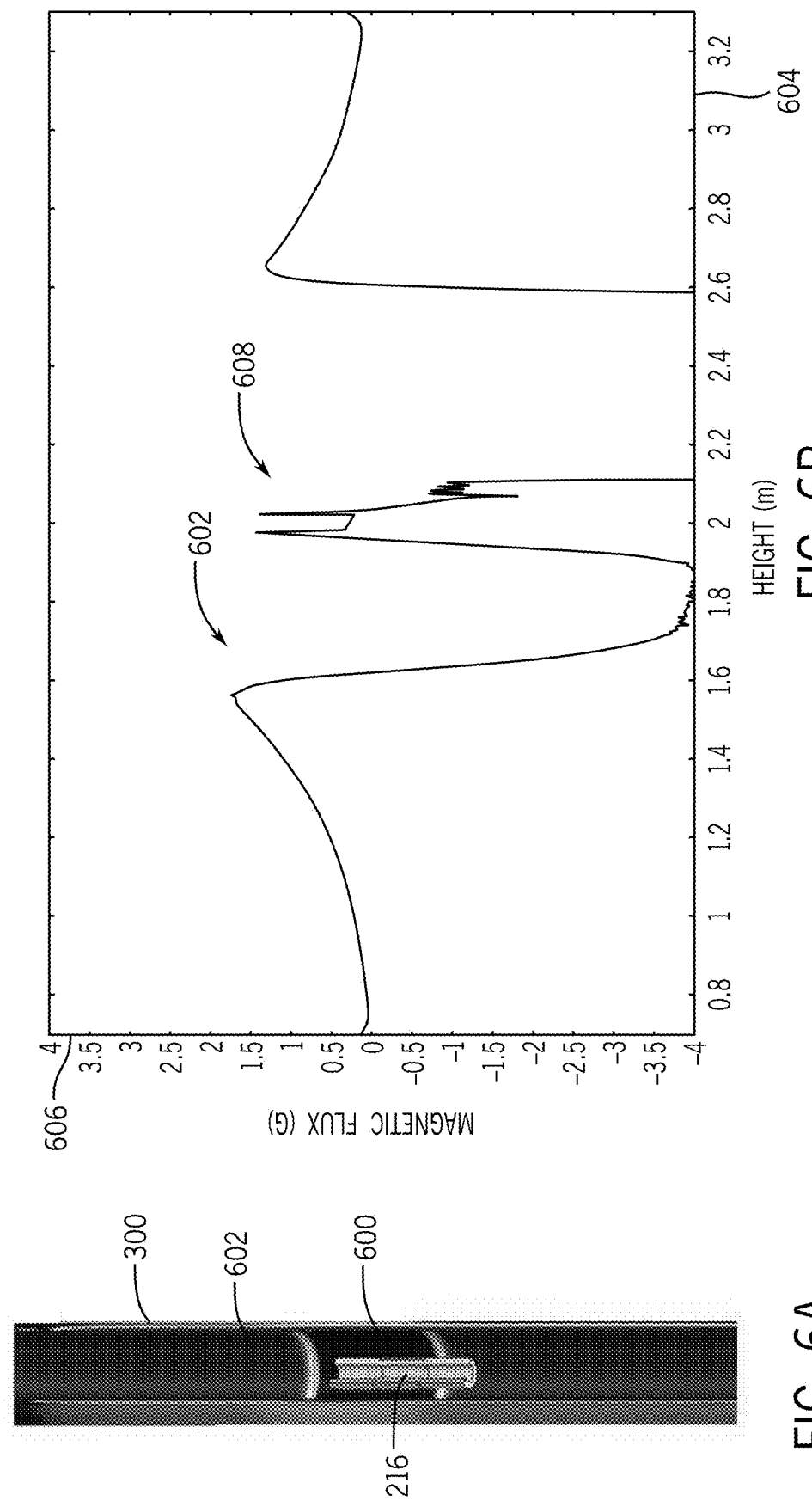
FIG. 6A is a schematic cross-sectional view of a magnetic flux within a pipe, in accordance with embodiments of the present disclosure.
FIG. 6B is a graphical representation of a magnetic flux within a pipe, in accordance with embodiments of the present disclosure.

FIG. 6A is an isometric cross-sectional view of an embodiment of the pulsed coil 216 arranged within a pipe 300 and FIG. 6B is a graphical representation of a magnetic flux within the pipe 300. In the illustrated embodiment, both the permanent magnet the pulsed coil 216 has moved in a downward direction, axially along the pipe 300 when compared to FIGS. 4A and 5A. The pulsed coil 216 as emitted a magnetic signal, as illustrated by the flux signature 600 on the pipe 300. As noted above, the pulsed coil 216 may emit pulses at a variety of different times to increase the magnetic flux in the pipe 300.

FIG. 6B represents the magnetic flux 602 present within the pipe 300, with the x-axis 604 indicating an axial position of the pipe, and the y-axis 606 indicating a magnetic flux value. As illustrated by the peak 608, the pulse of the pulsed coil 216 generates a spike in the flux of the pipe 300.

FIG. 7A is an isometric cross-sectional view of an embodiment of the pulsed coil 216 arranged within a pipe 300 and FIG. 7B is a graphical representation of a magnetic flux within the pipe 300. In the illustrated embodiment, both the permanent magnet the pulsed coil 216 has moved in a downward direction, axially along the pipe 300 when compared to FIGS. 4A, 5A, and 6A. The pulsed coil 216 has emitted a magnetic signal, as illustrated by the flux signature 600 on the pipe 300, but is now downhole of the flux signature 600 and has not emitted a second pulse.

FIG. 7B represents the magnetic flux 700 present within the pipe 300, with the x-axis 702 indicating an axial position of the pipe, and the y-axis 704 indicating a magnetic flux value. As illustrated by the peak 608, the pulse of the pulsed coil 216 generates a spike in the flux of the pipe 300. As noted above, in the illustrated embodiment the permanent magnet 214 may have a negative orientation (resulting in the negative flux) and an oppositely orientated pulsed coil 216 may have a positive orientation, thereby providing the spike. While the peak 608 magnitude may be similar to the flux from the permanent magnet 214, the negative DC offset created by the permanent magnet 214 provides a higher relative peak 608, and as a result, changes in the peak 608 (e.g., magnetic flux) may be more easily identified. Accordingly, the MFIT 200 may be run into the hole and the magnetic flux may be read along the length of the pipe. Various different pulses may be generated and recorded, thereby forming the graphical representations. Subsequently, a force may be applied to the pipe 300 and when the MFIT 200 is withdrawn, second measurements may be obtained to evaluate the magnetic flux. As described, a change in the magnetic flux may be representative of a free of non-stuck portion of the pipe 300, while no change represents a stuck pipe 300.

FIGS. 8A and 8B are graphical representations 800, 802 of a magnetic flux 804 after a strain has been applied to the pipe. As noted above, in various embodiments, the MFIT 200 will "write" the magnetic flux on to the pipe 300 and then a force is applied to the pipe 300. The illustrated representations 800, 802 include a force applied in an axial direction (e.g., along a length of the pipe). Due to magnetostriction, the region of the pipe which experiences strain will experience a change in magnetic retentivity, while the region below the stuck point will not. FIG. 8A illustrates the magnetic flux along the y-axis 806 and the axial position of the pipe 300 along the x-axis 808. Additionally, a plurality of different strains are illustrated by the legend 810, with a no-strain condition 812 illustrated with a flux of approximately −8.5 G at an given position 814 and the resulting strain conditions having a flux of approximately −7 G at the given position 814. In other words, the stuck point may be identified due to the change in magnetic flux, which may be identified over a variety of different strain conditions.

FIG. 8B provides a detailed view at approximately the given position 814, illustrating the plurality of different strain conditions. The no-strain condition 812 is again shown to have a magnetic flux of approximately −8.5 G at the given position 814. However, the magnetic flux for the remaining strain conditions at the given position 814 is between approximately −7 and −7.2 G. That is, a difference in the magnetic flux is visible due to the magnetostriction that occurs as a result of the stuck portion of the pipe. As a result, the stuck point may be identified because a stuck portion of the pipe will not react to the applied force, while a free portion of the pipe will. In this manner, the stuck point may be identified, which enables remediation techniques. Embodiments of the present disclosure may identify the stuck point faster and with more accuracy than previous techniques.

It should be appreciated that, while the graphical representations of FIGS. 8A and 8B are axial signatures, that in various embodiments radial signatures and/or hoop signatures may also be evaluated. For example, the sensors may collect data from a variety of different axes. As a result, data between different axes may be compared to provide additional confidence regarding identification of the stuck point. Moreover, as noted above, the force may be in a variety of different directions, and as a result, different forces may also be applied to further increase confidence related to identification of the stuck point.

Figure 9:
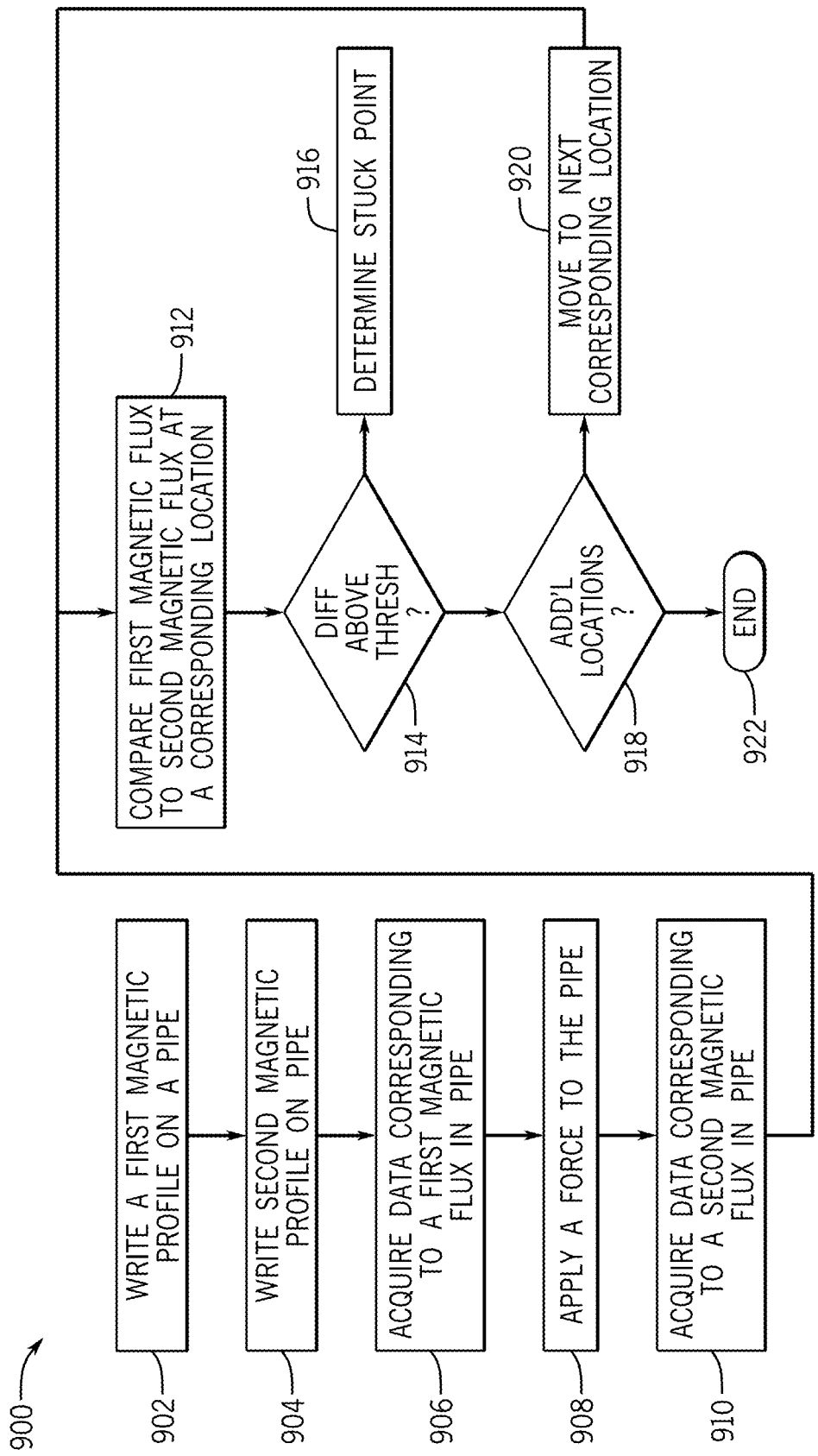
FIG. 9 is a flow chart of an embodiment of a method for determining a stuck point, in accordance with embodiments of the present disclosure.

FIG. 9 is a flow chart of an embodiment of a method 900 for determining a stuck point in a wellbore, for example a stuck point of pipe positioned within the wellbore. It should be appreciated that for this method, and other methods described herein, that the claims may be performed in a different order, or in parallel, unless otherwise explicitly stated. Moreover, there may be more or fewer steps and certain steps of the method may be optional. During a drilling operation, a pipe may become stuck in a wellbore, as noted above. It may be desirable to retrieve at least a portion of the piping downhole, as the pipe may be costly for operators. During recovery operations, the pipe may be cut or unthreaded at a location uphole of a stuck point, thereby allowing the unstuck portions to be freely removed. However, it may be difficult to identify the stuck point. Embodiments of the present disclosure may utilize the MFIT to position a tool within the pipe to identify the stuck point. The tool may be run into the pipe (e.g., lowered downhole into the pipe) to write a first magnetic profile on the pipe 902. The first magnetic profile may be from a permanent magnet that is incorporated into the MFIT. In various embodiments, a second magnetic profile may be written on the pipe 904. In various embodiments, the second magnetic profile is a result of a pulsed coil (e.g., electromagnet) that is also incorporated into the MFIT. As noted above, in certain embodiments the permanent magnet may be offset from the pulsed coil, for example, arranged downhole of the pulsed coil. However, in embodiments, the permanent magnet and pulsed coil may be integrated into a singular unit. The combination of the first magnetic profile and the second magnetic profile may generate a magnetic flux within the pipe.

In various embodiments, data is acquired that corresponds to a first magnetic flux of the pipe 906. The first magnetic flux may be associated with the magnetic flux generated by the first magnetic profile and the second magnetic profile. As described, data may be acquired via downhole sensors incorporated into the MFIT. The sensors are positioned uphole of the first and second magnetic components in order to acquire data after the first and second magnetic profiles are written. In various embodiments, the data acquisition includes a profile that illustrates the first magnetic flux as a function of a location along an axial length of the pipe. That is, one or more position sensors may be incorporated in order to determine a location of different magnetic flux measurements.

As noted above, magnetostriction may enable the MFIT to identify the stuck point by comparing how magnetic flux changes in areas of the pipe in response to an applied force. Accordingly, the method may also include applying a force to the pipe 908. This force may be an axial force (e.g., a pull or push), a radial force, a torsional force (e.g., a twist), or a combination thereof. Next, a second data acquisition process may correspond to a second magnetic flux in the pipe 910. The second magnetic flux may correspond to a change resulting from the applied force. In other words, the second magnetic flux may be referred to as the magnetic flux measured after the application of the force. For example, as noted above, the area of the pipe above the stuck point is anticipated as having a reduced magnetic flux due to magnetostriction while the area blow the stuck point is anticipated as having the same or substantially same magnetic flux. The second data acquisition event includes tripping the MFIT out of the pipe/wellbore such that the sensor array is first, with respect to the magnetic sources. As a result, the permanent magnetic will not re-magnetize or modify the readings, and moreover, the pulsed coil may be shut off during the second data acquisition event. The second data acquisition event, like the first data acquisition event, may also correlate the magnetic flux to the wellbore position, thereby enabling comparison with the first magnetic flux.

In various embodiments, the first and second magnetic fluxes are compared at a corresponding location 912. For example, each magnetic flux may be evaluated at an equal or substantially equal location within the pipe. The comparison may evaluate a difference or change in the magnetic flux, for example, against a threshold 914. If the difference exceeds the threshold, the stuck point may be determined 916. However, if the difference does not exceed the threshold, additional data may be considered 918. If there is additional data 920, those corresponding points may be reevaluated against the threshold. If there is no additional data, the method may end 922. In this manner, various positions along a length of the pipe may be evaluated to determine the stuck point.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

What is claimed is:

1. A system for determining a stuck point of a pipe positioned within a wellbore, comprising:
   a tubular housing;
   a sensor array positioned within the tubular housing, the sensor array arranged at a first end of the tubular housing;
   a first magnetic source positioned within the tubular housing, the first magnetic source arranged at a second end of the tubular housing; and
   a second magnetic source positioned within the tubular housing, the second magnetic source arranged between the sensor array and the second end;
   wherein the first magnetic source and the second magnetic source have a different magnetic field source, the first magnetic source is arranged to generate a first magnetic field in a direction opposite a second magnetic field generated by the second magnetic source, and the first magnetic field and the second magnetic field are applied at different times.

2. The system of claim 1, wherein the first magnetic source is a permanent magnet and the second magnetic source is an electromagnet.

3. The system of claim 1, wherein the first magnetic source and the second magnetic source are integrated into a transmitter.

4. The system of claim 1, wherein the sensor array comprises a plurality of sensors, the sensors being anisotropic magneto-resistive sensors, Hall effect sensors, magneto-diodes, magneto-transistors, GMR magnetometers, superconducting quantum interference devices (SQUIDs), fluxgates, sensing coils, or a combination thereof.

5. A system, comprising:
one or more sections of pipe in a wellbore formed in a downhole formation;
a stuck section of pipe, of the one or more sections of pipe, the stuck section of pipe being positioned in the wellbore and having a free end, a stuck end, and a stuck point between the free end and the stuck end; and
a magnetic freepoint indicator tool (MFIT), comprising:
a sensor array, arranged at a first end of the MFIT, the sensor array measuring magnetic flux data;
a first magnetic source, arranged at a second end of the MFIT, the first magnetic source configured to write a first magnetic signature along the one or more sections of pipe; and
second magnetic source, the second magnetic source configured to write a second magnetic signature along the one or more sections of pipe;
wherein the sensor array measures a first magnetic flux and a second magnetic flux, the first magnetic flux comprising the first magnetic signature and the second magnetic signature, a comparison between the first magnetic flux and the second magnetic flux identifying the stuck point.

6. The system of claim 5, wherein the first magnetic source is a permanent magnet and the second magnetic source is an electromagnet, the second magnetic source being pulsed at intervals along the one or more sections of pipe.

7. The system of claim 5, wherein the first magnetic flux is written and measured during a tripping operation into the wellbore.

8. The system of claim 5, wherein the second magnetic flux is a result of a force applied to the one or more sections of pipe, the force being applied from a surface location.

9. The system of claim 8, wherein the second magnetic flux is measured during a tripping operation out of the wellbore.

10. The system of claim 5, wherein the sensor array comprises a plurality of sensors, the sensors being anisotropic magneto-resistive sensors, Hall effect sensors, magneto-diodes, magneto-transistors, GMR magnetometers, superconducting quantum interference devices (SQUIDs), fluxgates, sensing coils, or a combination thereof.

11. The system of claim 5, wherein the comparison between the first magnetic flux and the second magnetic flux evaluates axial signatures.

12. The system of claim 5, wherein the comparison between the first magnetic flux and the second magnetic flux evaluates radial signatures.

13. A method for identifying a stuck point of a pipe arranged in a wellbore, comprising:
writing a first magnetic profile along at least a portion of the pipe;
writing a second magnetic profile along at least the portion of the pipe, wherein at least a portion of the first magnetic profile overlaps at least a portion of the second magnetic profile;
acquiring a first magnetic flux over at least the portion of the pipe;
acquiring a second magnetic flux over at least the portion of the pipe; and
determining that a difference between the first magnetic flux and the second magnetic flux at an overlapping location exceeds a threshold.

14. The method of claim 13, further comprising:
applying a force to the pipe, the force being at least one of an axial force, a radial force, or a torsional force.

15. The method of claim 13, wherein the first magnetic profile corresponds to a permanent magnet and the second magnetic profile corresponds to a pulsed coil.

16. The method of claim 13, wherein both the first magnetic profile and the second magnetic profile are written to the at least one portion of the pipe during a signal tripping operation into the wellbore.

17. The method of claim 13, wherein the second magnetic flux is acquired during a signal tripping operation out of the wellbore.

* * * * *